United States Patent [19]

Mangelsdorf et al.

[11] Patent Number: 5,008,904
[45] Date of Patent: Apr. 16, 1991

[54] SYNCHRONIZER USING CLOCK PHASE EXTRAPOLATION

[75] Inventors: Steven T. Mangelsdorf, Fort Collins, Colo.; David V. James, Palo Alto, Calif.

[73] Assignee: Hewlett-Packard Co., Palo Alto, Calif.

[21] Appl. No.: 384,588

[22] Filed: Jul. 24, 1989

[51] Int. Cl.⁵ .............................................. H03M 9/00
[52] U.S. Cl. .................................... 375/107; 375/118; 370/85.14
[58] Field of Search ............................. 370/85.14, 105; 375/107, 108, 118, 119; 364/200, 900

[56] References Cited

U.S. PATENT DOCUMENTS 4,451,886 5/1984 Guest et al. ......................... 364/200
4,748,623 5/1988 Fujimoto ............................. 370/105

Primary Examiner—Benedict V. Safourek
Assistant Examiner—Young T. Tse

[57] ABSTRACT

Disclosed is a data bus synchronizer circuit based on the principle that if the phase relationship of a sending bus clock and a receiving bus clock is known at a first point in time, and the frequencies of the two clocks are known and fixed, then the phase relationship can be determined at any time in the future through extrapolation. The circuit has a pipe, used to remove metastability from the sending bus clock, comprising a plurality of flip-flop circuits connected in series. The clock of the sending bus is input to the first flip-flop of the pipe, and the pipe flip-flop circuits are clocked by the receiving bus clock. Because the extrapolation principle, the pipe can be arbitrarily long. Output of this pipe is fed to the input of a serial to parallel conversion circuit comprising a second group of flip-flop circuits connected in series, and clocked by the receiving bus clock. The parallel outputs of the converter are fed to selector circuits, with the desired adjacent parallel outputs being selected by programming bits which allow the circuit to be adapted to varying ratios of sending and receiving clock speeds. The outputs of the selector circuits are fed to an AND gate that creates an enabling signal that is used to enable the transfer. The circuit allows a transfer even where one of the bus cycles is more than twice as long as the other bus cycle, and the circuit takes advantage of bus setup time to speed up data transfers.

20 Claims, 4 Drawing Sheets

SYNCHRONIZER USING CLOCK PHASE EXTRAPOLATION

BACKGROUND OF THE INVENTION

This invention relates to electrical circuits and more particularly to digital logic circuits. Even more particularly, the invention relates to a circuit for synchronizing data transfer between two data busses that are being clocked asynchronously.

In digital electronic systems, data is often transferred over a data bus wherein the data is sent in parallel signals and the transfer is synchronized with a clock signal. Such systems may have more than one data bus, and the busses are usually not synchronized to each other. That is, they run from different clocks, which causes them to be asynchronous with respect to each other. As well as being asynchronous, they also typically run at different speeds. When data must be transferred from one bus to another, the bus clock signals must be synchronized in some manner. This has been done conventionally by detecting a clock rising edge on the sending bus, then enabling the next rising edge on the receiving bus to latch the data onto the receiving bus.

In order to successfully transfer data on a bus, the data must be placed on the bus and allowed to stabilize before the rising edge of the clock signal transfers it to its destination. This stabilization time is called setup time. In prior art circuits, the performance of transfers between two busses is slow because data is not enabled onto the receiving bus until after the rising edge of the clock from the sending bus. Thus a second setup time is required on the receiving bus, and this setup time always occurs after the sending bus setup and rising edge of the sending clock.

Also, in prior art synchronization circuits, if the minimum pulse width of the sending bus clock is less than the period of the receiving clock, a rising edge of the sending clock may be missed, and the transfer will not occur until a subsequent cycle, further delaying the transfer or the system may fail to work.

Prior art circuits use the same design regardless of the speeds of the two busses, thus the delay in transferring data varies depending on the relative speed. That is, these circuits lack the ability to adjust to the two frequencies, to optimize, the data transfer. Sometimes this causes the prior art circuits to fail.

It is thus apparent that there is a need in the art for an improved method or apparatus which improves performance of data transfers between two data busses by allowing data transfer to occur during the setup time of the sending bus. There is a further need in the art for such a synchronization circuit that will detect sending bus clock pulses that occur between the edges of the receiving clock, and there is a still further need in the art for a synchronizer circuit that can be adjusted to optimize the data transfer, based on the speeds of the two busses.

SUMMARY OF THE INVENTION

It is an object of the present invention to provide apparatus to synchronize data transfers between data busses.

It is an object of the present invention to provide apparatus to synchronize data transfers between different speed data busses.

It is another object of the invention to use previous clock samples to determine when such data transfer should occur.

It is a still another object of the present invention to provide such apparatus that allows a transfer to start during the setup time of the sending bus.

A further object is to ensure that a clock signal edge on the sending bus is not missed if the minimum pulse width or the minimum low time of the sending clock is shorter than the period of the receiving bus clock.

A still further object of the present invention is to provide apparatus that can be programmed to operate over a range of sending and receiving bus clock frequencies.

The above and other objects are accomplished in a synchronizer circuit based on the principle that if the phase relationship of the two clocks is known at a first point in time, and the frequencies of the two clocks are fixed, then the phase relationship can be determined at any time in the future through extrapolation. The circuit has a pipe for removing metastability comprising a plurality of flip-flop circuits connected in series followed by a serial to parallel converter. Two adjacent taps of the parallel output signals from the converter are selected and ANDed together to create an enable signal used to enable the transfer of data from the sending bus to the receiving bus.

The clock of the sending bus is input to the first flip-flop of the metastabilizing pipe, and the pipe flip-flop circuits are clocked with the clock of the receiving bus, to remove metastability from the sending clock. Because of the extrapolation principle, the metastabilization pipe can be arbitrarily long. Output of this pipe is fed to the input of a serial to parallel conversion circuit comprising a second group of flip-flop circuits connected in series, and clocked by the receiving bus clock. The parallel outputs of the converter are fed to selector circuits, and the desired adjacent parallel outputs are selected by programming bits, connected to the selector circuits, which allow the circuit to be adapted to varying ratios of sending and receiving clock speeds. The outputs of the selector circuits are fed to an AND gate that creates the enabling signal that is used to enable the transfer.

A third parallel output may be selected and combined with the first two selected outputs to improve the resolution and allow detection of a sending clock rising edge, even if the pulse width of the sending clock is less than the period of the receiving clock.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

The present invention is a synchronizer used to allow data to be transferred between two data busses having asynchronous clocks. Typically, one bus is faster than the other, and provision must be made, when transferring data from one to the other, for selecting the receiving bus clock cycle to be used in the data transfer. The ideal receiving clock cycle is the one that first occurs after the data is available on the sending bus. However, in prior art devices, the search for the receive clock cycle does not start until a sending clock cycle has started, so even if the data is available sooner, it will not be transferred until after the sending clock cycle had started. The present invention is based on the principle that if the phase relationship of the sending and receiving clocks is known at a first point in time, and the frequencies of the two clocks are known, then the phase relationship can be determined at any time in the future through extrapolation. The invention uses extrapolation to predict when the sending clock will occur, and thus is independent of the actual occurrence. Because of this independence, data transfer can take advantage of the sending bus setup time, and, if a receive clock is available during this setup time, start the data transfer before the sending clock cycle begins.

Figure 1:
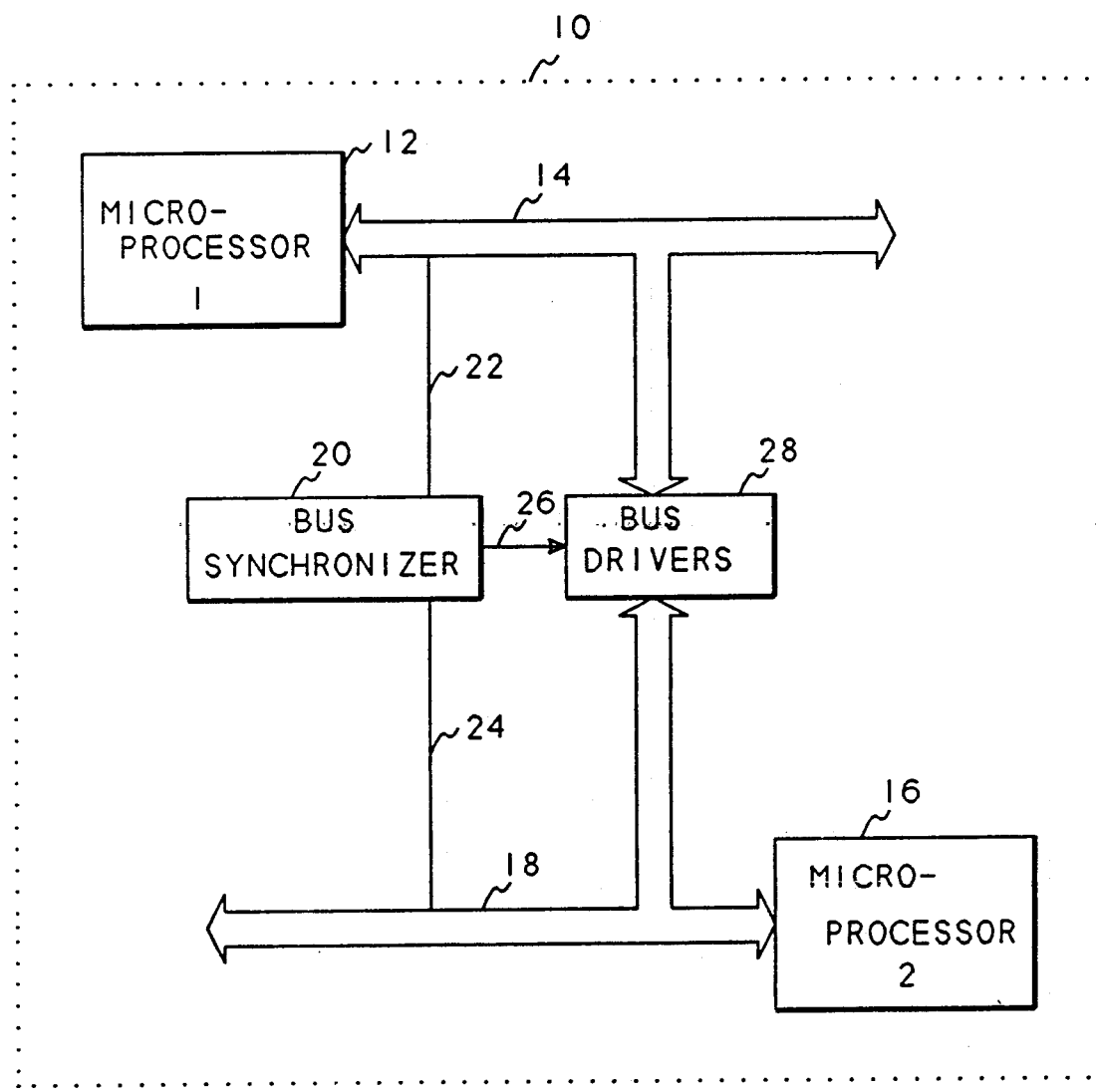
FIG. 1 is a block diagram of a digital electronics system showing the environment of the present invention.

The environment of the present invention is depicted in FIG. 1. Referring now to FIG. 1, a device 10 is shown having a first microprocessor 12 connected to a first data bus 14, used for transferring data to and from the microprocessor 12. A second microprocessor 16 is connected to a second data bus 18 which is used for transferring data to and from the second microprocessor 16. In order for these two microprocessors to communicate efficiently, data must be transferred between the data bus 14 and the data bus 18. If the clocks of the two microprocessors are running asynchronously, which is often the case, the data bus 14 and the data bus 18 must be synchronized by a bus synchronization circuit 20 before data can be transferred between the two data busses. The synchronizer 20 of the present invention receives a clk1 signal 22 from the first data bus 14 and it also receives a clk2 signal 24 from the second data bus 18. As will be described below, the synchronizer 20 determines when data being transferred from one of the buses is to be enabled onto the other of the busses, and it sends an enabling signal 26 to the receiving bus which indicated the validity of the transferred data. In the description provided below, data transfer will be illustrated from the first data bus 14 to the second data bus 18, however, those skilled in the art will recognize that data can easily be transferred either way by using a second synchronizer and a second set of drivers. Also, those skilled in the art will recognize that the data busses may be driven by circuits other than microprocessors.

Figure 2:
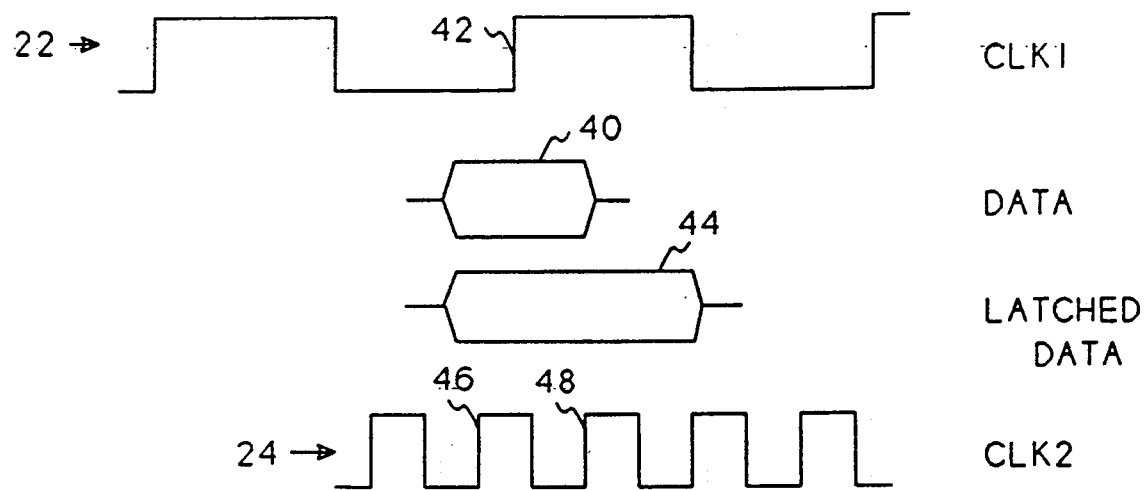
FIG. 2 is a timing diagram showing the data transfer cycle between two data busses.

FIG. 2 shows a timing diagram of a data transfer from the first data bus 14 (FIG. 1) to the second data bus 18 (FIG. 1), and assumes that the data bus 14 is clocked at a slower rate than the second data bus 18. Referring now to FIG. 2, data 40 is placed on the data bus 14 (FIG. 1) prior to a rising edge 42 of clk1 22. The difference in time between the arrival of data 40 and the rising edge 42 of clk1 22 is called the data setup time. This time is required to compensate for propagation delay along the data bus 14 and to provide setup time for the receiving circuits that will receive the data from the data bus 14. Because the data 40 need only be active until the rising edge 42 of the clock 22, and may drop after the edge 42, the data is latched in the bus driver circuit 28 (FIG. 1). This latched data is shown as signal 44. To transfer data from the first data bus, one of the rising edges of clk2 24 must be selected to transfer the data onto the second data bus 18 (FIG. 1). Two edges, 46 and 48, may be used for this transfer, since the latched data is available during the rise of both the edges 46 and 48. A synchronizer circuit is needed to select which of these two edges can be used, and edge 46 is preferable since it would transfer the data sooner and improve performance. However, edge 46 actually occurs prior to the rising edge 42 of clk1 22, and in prior art circuits this edge would never be selected.

There are many timing constraints on the position of the receiving clock edge with respect to the sending clock edge. It obviously must not precede the arrival of the data on the first data bus 14, although it starts with the arrival of the data, and it must occur before the contents 44 of the latch are lost. Taking these constraints into account, there is a window of time with respect to the clk1 edge when the receiving clock edge can occur. This window must be at least one clk2 period long, in order to guarantee that there will be at least one clk2 cycle that will have an edge that can be used. It is generally desirable for the clk2 edge to come as early as possible within the window, in order to minimize latency for data transfer.

Figure 3:
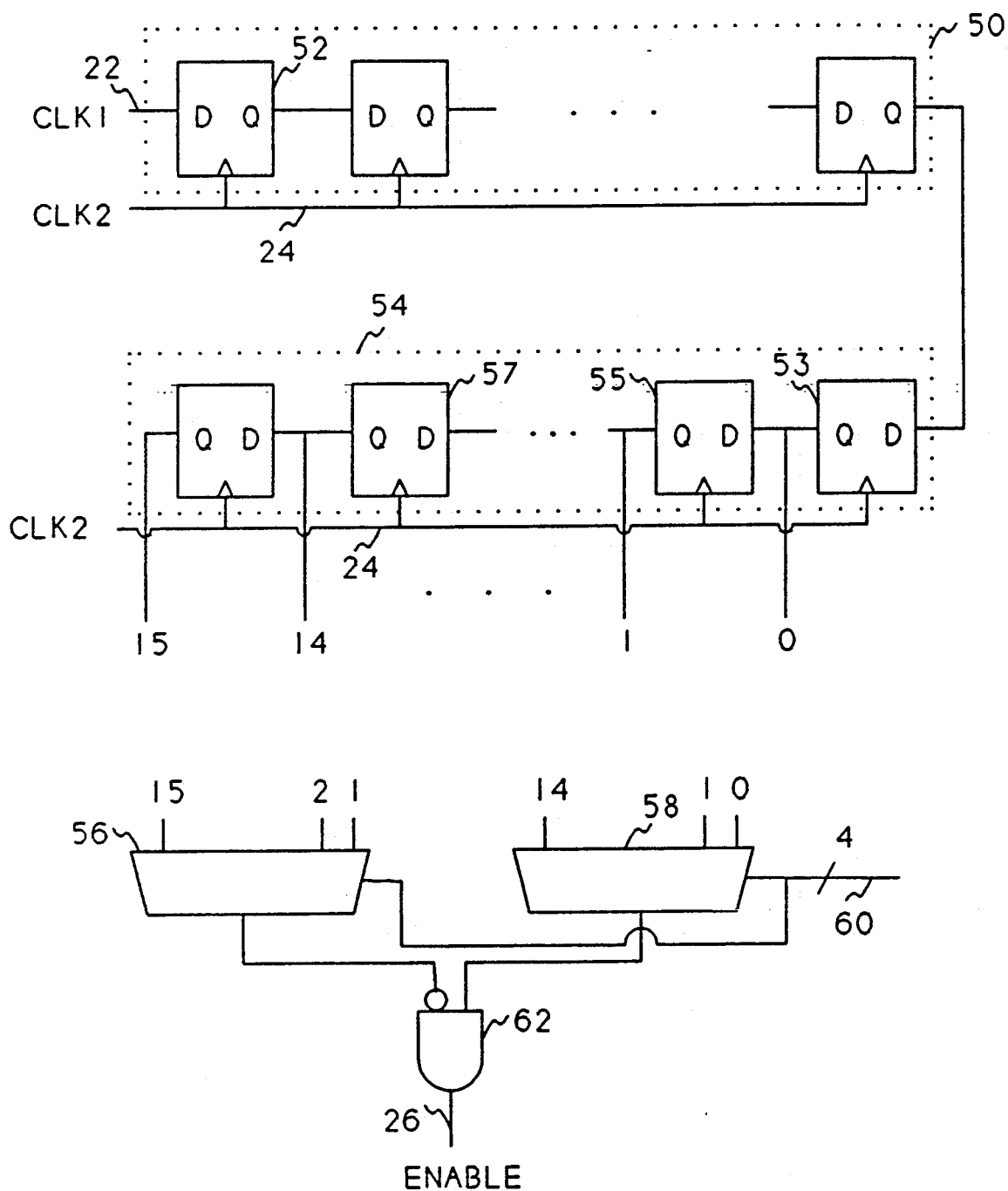
FIG. 3 is a logic diagram of the circuit of the present invention.

FIG. 3 shows the synchronizer circuit of the present invention. Referring to FIG. 3, samples of clk1 22 enter the first flip-flop 52 of the metastabilizing pipe 50, which is clocked with clk2 24. The function of the metastabilizing pipe 50 is to remove metastability from clk1 22, and because of the extrapolation principle describer earlier, pipe 50 can be of any length. Samples entering the pipe 50 establishes the phase relationship between clk1 22 and clk2 24. When the samples exit the pipe 50, they still determine the phase relationship at the time the samples were taken, however, since the frequencies of the clocks are known and fixed, they also determine the phase relationship at the present time. Therefore, the delay through the metastabilization pipe 50 can be arbitrarily long.

The synchronizer requires that the frequencies be known and fixed, however, in reality there will always be some frequency error in the clocks. This error introduces inaccuracy into the extrapolation and therefore restricts the length of the metastabilization pipe 50. In practice, the error is not large enough to be of concern, especially if the clocks are generated with crystal oscillators, which is normally the case.

After exiting the pipe 50, the signal enters a delay pipe 54 which accomplishes serial to parallel conversion. The length of the delay pipe 54 is also arbitrary, because of extrapolation, and will usually be selected to provide an adequate choice of window times. The parallel output of the delay pipe 54 is connected to the inputs of two multiplexors 56 and 58. The Q output of the first flip-flop 53 of the delay pipe 54 (labeled 0 in FIG. 3) is connected to the first input of the multiplexor 58, the Q output of the second flip-flop 55 is connected to the second input of multiplexor 58 and also connected to the first input to the multiplexor 56, etc. The output of the next to last flip-flop 57 is connected to the last input of multiplexor 58 and to the next to last input of multiplexor 56. The multiplexors are used to select two samples from the delay pipes, and, as illustrated above, the connections are made such the two samples selected come from adjacent taps of the delay pipe 54, which means that the two samples will be taken from two sequential clk2 24 samples of clk1 22. The samples selected are determined by programming bits 60 which are connected to the selector inputs of the multiplexors 56 and 58. By setting combinations of the programming inputs 60, any of the samples from the delay pipe 54 can be selected. The selected samples are connected to an AND gate 62 to generate the enable signal 26 (also shown in FIG. 1). The enable signal will be generated when a sample showing clk1 low is followed by a sample showing clk1 high, which means that a rising edge occurred between the two samples. As will be shown below, the samples are selected by the programming bits for a particular timing window. The programming bits do not change during operation, the multiplexors are intended only to make the tap locations easily changeable, so that the synchronizer can be configured to operate at different clk1 and clk2 frequencies. In particular, if this circuit is contained within an integrated circuit, the programming pins could be made available as external pins, allowing the synchronizer to be used in many situations. Although FIG. 3 shows a delay pipe 54 having 16 stages, and it shows 16 bit to 1 bit multiplexors 56 and 58 being controlled by 4 programming inputs 60, other combinations could be used, depending upon the range of clock frequencies for clk1 and clk2 and the accuracy with which the enable can be positioned relative to clk1.

Figure 4:
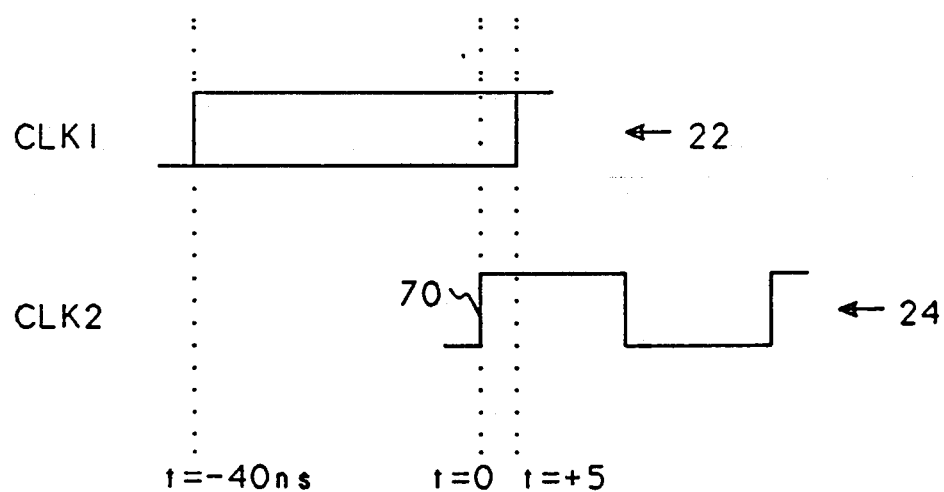
FIG. 4 is a timing diagram of the clocks in a data transfer example.

Selecting the best delay pipe 54 taps will be illustrated by the following example. Suppose the frequency of clk1 22 is 8 mhz, with a period of 125ns, and the frequency of clk2 24 is 33.3 mhz, with a period of 30ns. Further, suppose that the data setup time is 5ns, and that the pulse width of clk1 is such that the data will only be available for 40ns after the rising edge 42 of clk1 (because the data is held latched by the high time of the clk1 signal). This example is illustrated in FIG. 4, which shows that the edge 70 of clk2 24 can be used if a clk1 edge occurs between time −40ns and +5ns. That is, since the latched data will be held for 40ns after a clk1 edge, any clk2 edge occurring within 40ns after the clk1 edge can be used to transfer data. Also, since the setup time is 5ns, a clk2 edge can be used if it occurs no more than 5ns before the clk1 edge. If the clk2 edge is considered to be time zero, then if a clk1 edge occurs between time −40ns and time +5ns, the clk2 edge can be used.

Since the metastabilization pipe 50 can be arbitrarily long, using a pipe of 16 stages will result in the delay pipe tap sample times shown in Table 1. Tap 1 is a clk1 sample that is 18 cycles old, that is, the clk1 signal has been through the 16 flip-flops of the pipe 50, plus the first two flip-flops of the delay pipe 54, delaying it by 18 cycles. Eighteen cycles of clk2 is 540ns (18 * 30), so enable signal 26 will be true if there was a clk1 edge between time = −540ns and time = −510ns. The period of clk1 is 125ns, so this is the same as saying that enable 26 will be true if there was a clk1 edge between time = −40ns (−540+4 * 125) and time = +115ns (−510+5 * 125), which is also −10ns (−510+4 * 125). This would be within the window, so this tap is acceptable, however another tap may be better. Tap 14, for example, has a window of −25 to +5, which would cause the transfer to occur earlier within the window, therefore this would be a better choice for the tap.

Figure 5:
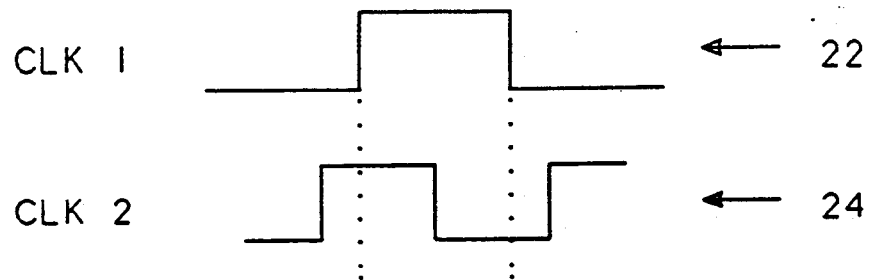
FIG. 5 is a timing diagram of two clocks wherein the pulse width of the sending bus clock is shorter than the period of the receiving bus clock.

When the minimum pulse width of clk1 is shorter than the period of clk2, three taps may be needed to ensure that a rising edge of clk1 is not missed. FIG. 5 shows a timing diagram that illustrates this point. Referring to FIG. 5, the time that clk1 is high, that is from its rising edge to its trailing edge, is less than the period of clk2. If clocks having these characteristics are used with the synchronizer of FIG. 3, the rising edge of clk1 would missed whenever the situation depicted in FIG. 5 occurred. The synchronizer may still function correctly, however, it would not perform optimally, since a transfer would not occur until a clk1 edge was detected.

Figure 6:
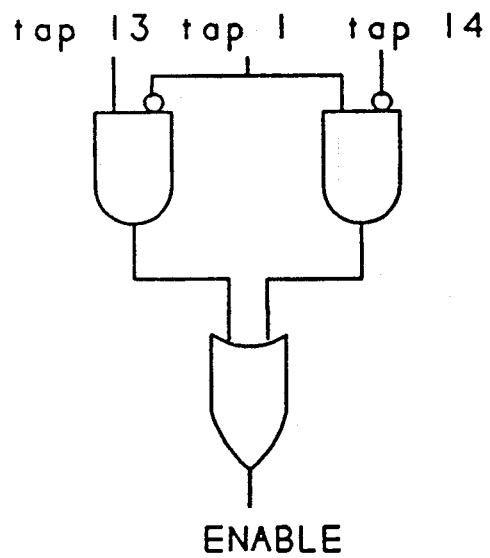
FIG. 6 shows a circuit that will detect all edges of clocks having the relationship shown in FIG. 5.

FIG. 6 shows a circuit that will improve the performance under the circumstances where the clk1 pulse width is short. Referring to FIG. 6, a third tap, tap 1, can be used to reduce the sample time of the circuit. Tap I provides a sample that gives the state of clk1 at time = −10ns. Therefore, enable will be true if clk1 is low at time = −25ns and high at time = −10ns, OR, clk1 is low at time = −10ns and high at time = +5ns. The samples are now effectively 15ns apart instead of 30ns, which extends the operating conditions of the synchronizer for low clk2 frequency or shorter clk1 pulse widths.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

TABLE 1

| TAP | TIME | RELATIVE TIME | |
|---|---|---|---|
| 0 | −510 | −10, | +115 |
| 1 | −540 | −40, | +85 |
| 2 | −570 | −70, | +55 |
| 3 | −600 | −100, | +25 |
| 4 | −630 | −5, | +120 |
| 5 | −660 | −35, | +90 |
| 6 | −690 | −65, | +60 |
| 7 | −720 | −95, | +30 |
| 8 | −750 | 0, | 0 + 125 |
| 9 | −780 | −30, | +95 |
| 10 | −810 | −60, | +65 |
| 11 | −840 | −90, | +35 |
| 12 | −870 | −120, | +5 |
| 13 | −900 | −25, | +100 |
| 14 | −930 | −55, | +70 |
| 15 | −960 | −85, | +40 |

What is claimed is:

1. An electrical circuit for synchronizing data transfers between a first data bus having a first clock signal and a second data bus having a second clock signal comprising:

means for storing a plurality of first clock cycles;

means for selecting a plurality of said stored cycles; and means for combining said selected cycles to generate an enable signal for enabling said data transfers; whereby previous first clock signals are used to predict a present first clock cycle.

2. The circuit of claim 1 wherein said storing means comprises serial to parallel conversion means having a plurality of parallel signals as an output.

3. The circuit of claim 2 wherein said serial to parallel conversion means comprises a plurality of flip-flop circuits connected in serial having said first clock signal as an input, and being clocked by said second clock signal.

4. The circuit of claim 2 wherein said means for selecting further comprises means for programming said selection whereby said selection may be changed for different relative speeds of said first clock signal and said second clock signal.

5. The circuit of claim 4 wherein said means for programming comprises a plurality of signal selection circuits each having all of said parallel signals as a first input, and each having a number of programming bits as a second input whereby said programming bits select said parallel signals.

6. The circuit of claim 5 wherein said parallel signals are always selected in adjacent pairs.

7. The circuit of claim 4 wherein said parallel signals are always selected in adjacent pairs.

8. The circuit of claim 1 wherein said means for combining comprises logical AND means.

9. The circuit of claim 2 wherein said means for combining comprises means for combining three of said parallel signals.

10. An electrical logic circuit for transferring data from a first data bus having a first clock signal to a second data bus having a second clock signal comprising:

sampling means for sampling said first clock at intervals defined by said second clock and providing a serial sample output;

means for converting said serial sample output of said sampling means to a plurality of parallel signals;

means for selecting at least two of said parallel signals;

means for combining said selected signals to generate an enable signal; and bus driving means connecting said first data bus to said second data bus, said bus driving means being enabled by said enable signal.

11. The circuit of claim 10 wherein said sampling means comprises a plurality of flip-flop circuits connected in serial having said first clock signal as an input, and being clocked by said second clock signal whereby said first clock is sampled at intervals defined by said second clock.

12. The circuit of claim 10 wherein said converting means comprises a plurality of flip-flop circuits connected in serial having said serial sample output as an input, and being clocked by said second clock signal.

13. The circuit of claim 10 wherein said means for selecting further comprises means for programming said selection whereby said selection may be changed for different relative speeds of said first clock signal and said second clock signal.

14. The circuit of claim 13 wherein said means for programming comprises a plurality of signal selection circuits each having all of said parallel signals as a first input, and each having a number of programming bits as a second input whereby said programming bits select said parallel signals.

15. The circuit of claim 14 wherein said parallel signals are always selected in adjacent pairs.

16. The circuit of claim 13 wherein said parallel signals are always selected in adjacent pairs.

17. The circuit of claim 10 wherein said means for combining comprises logical AND means.

18. The circuit of claim 10 wherein said means for combining comprises means for combining three of said parallel signals.

19. A process for synchronizing data transfers between a first data bus having a first clock signal and a second data bus having a second clock signal comprising the steps of:

sampling said first clock signal with said second clock signal and providing a serial sampled output;

converting said serial sampled output to parallel signals, selecting at least two adjacent parallel signals; ANDing said selected signals to produce an enable signal; and enabling a bus driver circuit connecting said first data bus to said second data bus with said enable signal.

20. The process of claim 19 wherein said selecting step further comprises the step of predefining said selected signals.

* * * * *